United States Patent [19]

Desyllas et al.

[11] 4,380,797

[45] Apr. 19, 1983

[54] TWO LEVEL STORE WITH MANY-TO-ONE MAPPING SCHEME

[75] Inventors: Peter L. Desyllas, Wilmslow; Barry G. Radley; Alasdair Rawsthorne, both of Glossop; John R. Eaton; John E. Murray, both of Salford, all of England

[73] Assignee: International Computers Ltd., London, England

[21] Appl. No.: 165,854

[22] Filed: Jul. 7, 1980

[30] Foreign Application Priority Data

Jul. 4, 1979 [GB] United Kingdom ............... 7923329

[51] Int. Cl.³ ............................................. G06F 13/00
[52] U.S. Cl. ..................................................... 364/200
[58] Field of Search ... 364/200 MS File, 900 MS File

[56] References Cited

U.S. PATENT DOCUMENTS 4,047,244  9/1977  Finkemeyer et al. ............... 364/200
4,086,629  4/1978  Desyllas et al. .................... 364/200

Primary Examiner—Raulfe B. Zache
Attorney, Agent, or Firm—Lee, Smith & Jager

[57] ABSTRACT

A data processing system has a two-level storage system in which data items are copied from a main store into a smaller, faster slave store on demand. The mapping of the main store on to the slave store is a many-to-one mapping so that situations will occur where two required data items cannot both be present simultaneously in the slave store because they map on to the same location. The system has special logic which detects this situation and, upon detection, temporarily suspends the use of the slave store and instead uses a smaller first-in first-out area of storage.

4 Claims, 2 Drawing Figures

TWO LEVEL STORE WITH MANY-TO-ONE MAPPING SCHEME

BACKGROUND OF THE INVENTION

This invention relates to data processing systems.

In data processing systems, it is well known to store data in a main store and to provide a smaller, faster slave store for holding copies of data items which are currently in use, these items being copied from the main store into the slave store on demand. The advantage of such a two-level storage arrangement is that it can have a high average access speed, approaching that of the slave store, but with a cost per bit of storage much lower than that of the slave store.

Various schemes have been proposed for mapping the data items from the main store on to the locations of the slave store. See for example the article "Concepts for Buffer Storage" by C. J. Conti in IEEE Computer Group News, March 1969, page 9. Some of these schemes involve a many-to-one mapping of the data; that is to say, each location of the slave store can hold a copy of any one of a plurality of different data items, while each data item in the main store can be copied into one particular location of the slave store only. An example of such a many-to-one mapping scheme is described on page 11 of the article mentioned above, under the heading "Direct Mapping Buffer".

Such a many-to-one mapping scheme is relatively easy to implement. However, it may sometimes be necessary or desirable to have two or more different data items simultaneously available in the slave, and this is clearly not possible where both of those items map on to the same location of the slave. The effect of this may be to slow the system down or even, in some cases, to prevent an operation being completed altogether.

An object of the present invention is therefore to provide a way of avoiding this problem.

SUMMARY OF THE INVENTION

According to a first aspect of the invention there is provided a data processing system having a main store and a smaller, faster slave store into which data items are copied from the main store on demand, the data items in the main store being mapped on to the locations of the slave store according to a many-to-one mapping scheme, wherein in operation a test is made to detect situations in which two (or more) data items are required to be available in storage of fast access speed but both those items map on to the same location of the slave store so that they cannot both be present simultaneously in the slave store, and wherein when the above situation is detected the use of the slave store is temporarily suspended and the required data items are all copied into a further store of smaller size than the slave store and having an access speed comparable to that of the slave store.

According to a second aspect of the invention there is provided a data processing system having a main store and a smaller, faster slave store into which data items are copied from the main store on demand, the data items in the main store being mapped on to the locations of the slave store according to a many-to-one mapping scheme, wherein in operation the system performs operations each of which requires a plurality of data items to be accessed, the system being such that if any one of those required data items is not available in the slave store the operation is aborted, the item is copied from the main store into the slave store, and the operation is then restarted from the beginning, and wherein in operation a test is made to detect situations in which two (or more) of the data items required by the operation currently being performed map on to the same location of the slave store so that they cannot both be present simultaneously in the slave store, and wherein the above situation is detected the use of the slave store is temporarily suspended and the required data items are all copied into a further store of smaller size than the slave store and having an access speed comparable to that of the slave store.

BRIEF DESCRIPTION OF THE DRAWINGS

One data processing system in accordance with the invention will now be described by way of example with reference to the accompanying drawings of which

GENERAL DESCRIPTION OF SYSTEM

Figure 1:
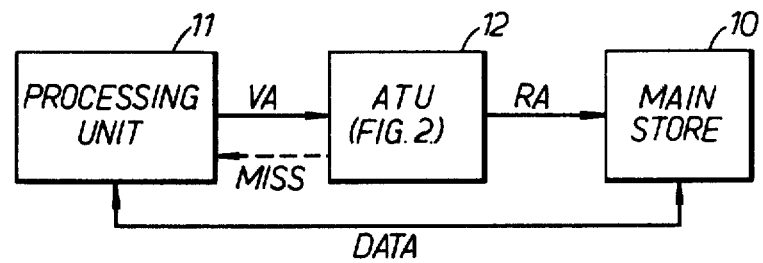
FIG. 1 is a block diagram of the system.

Referring to FIG. 1, the data processing system has a main store 10 containing instructions and operands. Every word in the store has a real address RA specifying its actual physical location in the store.

The system also includes a microprogram-controlled processing unit 11. In operation, this unit retrieves instructions from the main store 10, decodes them, and performs an appropriate microprogram routine for executing each instruction. Execution of the instruction may involve accessing one or more operands in the main store.

The processing unit 11 addresses data (instructions or operands) not in terms of their real addresses but in terms of virtual addresses VA. Each virtual address is 32 bits long, of which the 14 most significant bits represent a segment number SN while the 18 least significant bits represent a word number WN giving the position of the desired data word within the segment. Virtual addresses can be translated into their corresponding real addresses by means of a segment table held in the main store. The segment table comprises a number of entries, one for each segment, each entry holding the real address of the base of the relevant segment. Thus, a virtual address can be translated by first using its segment number portion SN to index the segment table so as to obtain the relevant segment table entry, and then adding the segment base address from that entry to the word number portion WN of the virtual address.

However, in practice, if the segment table had to be consulted every time a data word were addressed, the speed of operation of the system would be severely restricted. Therefore, virtual addresses are not normally translated by reference to the segment table. Instead, an address translation unit (ATU) 12 is used. The ATU 12 contains a small, fast slave store which holds copies of the segment table entries for those segments which are currently in use. This permits virtual addresses to be translated very rapidly provided the relevant segment table entries are present in the slave store. The segment table in the main store is consulted only if the relevant segment table entry is not present in the slave store.

Details of the processing unit 11 and the store 10 form no part of the present invention and they will therefore not be described any further in this specification. Moreover, the use of segment tables for translating virtual addresses into real addresses is well known in the art and will not be described in any more detail herein.

ADDRESS TRANSLATION UNIT

Figure 2:
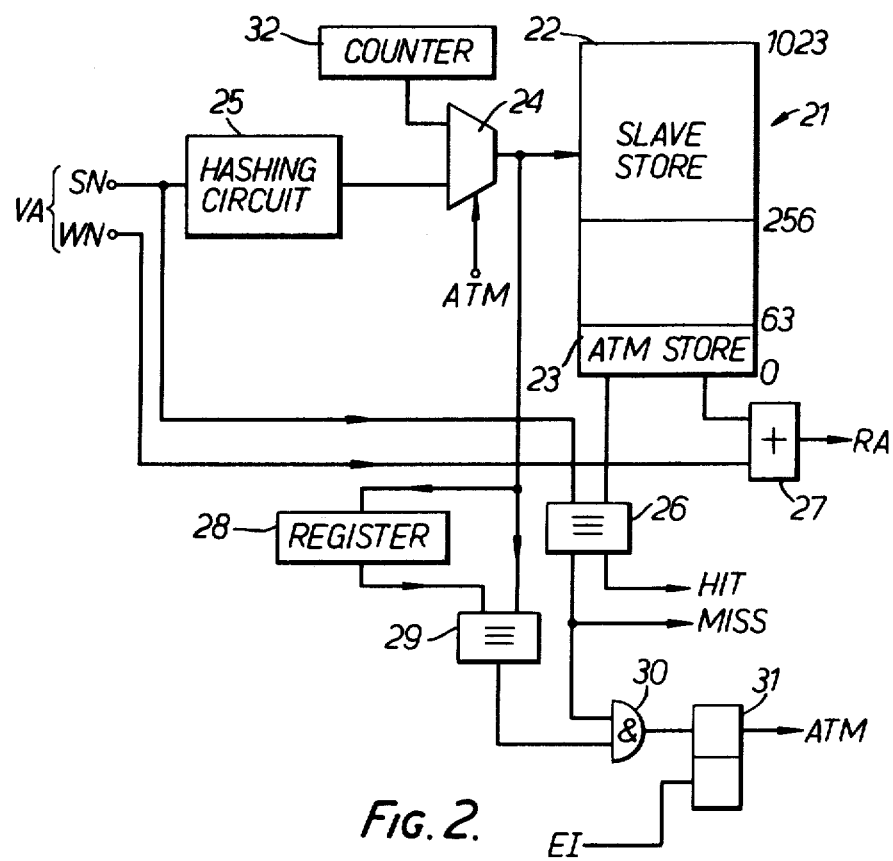
FIG. 2 shows the address translation unit of the system in greater detail.

Referring now to FIG. 2, the ATU comprises a random access memory 21 having 1024 locations numbered 0-1023. Locations 256-1023 (indicated by the reference numeral 22) constitute the slave store mentioned above. Locations 0-63 (indicated by the reference numeral 23) constitute a further store referred to as the ATM store, the purpose of which is described below. The remaining locations of the memory 21 are available for other purposes not relevant to the present invention.

Each location in the slave store 22 holds a copy of one of the entries in the segment table, along with the segment number of the associated segment.

The memory 21 is addressed by way of a multiplexer 24 which normally selects the output of a hashing circuit 25. The hashing circuit 25 comprises a set of exclusive-OR gates (not shown) which combine selected bits of the segment number SN of the virtual address received from the processing unit, so as to produce a 10-bit hash address in the range 256-1023. This hash address therefore addresses a location in the slave store portion 22 of the memory 21.

The hashing scheme results in a many-to-one mapping of the segment numbers on to the hash addresses and hence in a many-to-one mapping of the segment table entries on to the locations of the slave store.

The normal operation of the ATU is as follows.

When the processing unit 11 presents a virtual address to the ATU, the segment number portion SN of the address is hash coded, and the resulting hash address is used to address the slave store 22. The segment number contained in the addressed location of the slave store is read out, and compared with the segment number portion SN of the virtual address, by means of a comparator 26. If they are equal, a HIT signal is produced, indicating that the location contains the required segment table entry. The segment base address SB can therefore be read out of the slave store and added to the word number portion WN of the virtual address, by means of an adding circuit 27, so as to produce the required real address RA.

However, if they are not equal, a MISS signal is produced. Referring to FIG. 1, the MISS signal is applied as an interrupt signal to the processing unit 11, and causes the instruction currently being executed to be aborted. The processing unit then initiates a special microprogram routine for dealing with this interrupt. This routine consults the segment table in the main store 10 and copies the relevant entry into the currently addressed location of the memory 21. Details of this microprogram routine form no part of the present invention and so will not be described further herein. The execution of the instruction which was interrupted is then recommenced at the beginning. This time when the instruction presents the virtual address, the appropriate segment table entry should be found in the slave store and so the virtual address can be translated in the normal manner.

"THRASHING"

The system as described so far works well for instructions which only refer to a single operand. However, certain instructions may require several operands to be accessed during their execution. There is still no problem with this as long as the segment table entries of these operands all map on to different locations of the slave store 22. However, if two (or more) of the segment table entries map on to the same location of the slave store a "thrashing" state is entered in which, if no special precautions were taken, the instruction would continually be interrupted and restarted because it would never find all the required segment table entries in the slave store at the same time.

In the present system, this thrashing state is detected as follows. Whenever a MISS signal occurs, the hash address currently appearing at the output of the hashing circuit 25 is loaded into a register 28. Each hash address, when it appears, is compared with the current contents of the register 28 by means of a comparator 29. The output of the comparator 29 is fed to one input of an AND gate 30, the other input of which receives the MISS signal. Thus, the AND gate is enabled whenever a MISS signal is produced for the second time in respect of the same hash address (i.e. whenever a thrashing state is entered). The output of the AND gate 30 sets a bistable 31, putting the address translation unit into a mode of operation referred to as the anti-thrashing mode. When set, the bistable 31 produces a signal ATM which switches the multiplexer 24 so that it now selects the output from a counter 32 in place of the hash address. The counter 32 is six bits long and therefore produces an output in the range 0-63. Therefore, the output of the counter addresses the portion of the memory 21 referred to above as the ATM store 23. The counter 32 is reset to zero each time an instruction is started or restarted, and is incremented by one each time a virtual address is presented for translation. The ATM store therefore acts effectively as a first-in first-out store.

It can be seen that, in the anti-thrashing mode, the use of the slave store 22 is temporarily suspended and the ATM store 23 is used instead. Initially the ATM store is empty and so, each time a new virtual address is presented for translation a MISS signal is produced, causing the instruction to be aborted and the relevant segment table entry to be copied into the currently addressed location of the memory 21. Thus, the segment table entries required by the instruction are copied, one at a time, into successive locations of the ATM store. The instruction is then able to run to completion without any further interruption.

When the instruction terminates, the processing unit 11 issues an end-of instruction signal EI which resets the bistable 31, returning the address translation unit to its normal mode of operation.

EXAMPLE OF OPERATION

Suppose that a particular instruction calls for three operands with segment numbers SN1, SN2 and SN3 respectively. Suppose also that these segment numbers, when hashed, produce the hash addresses A, B and A respectively. It will be observed that two of the segment numbers (SN1 and SN3) produce the same hash address (A). In other words, two of the required segment table entries map on to the same location of the slave store and hence both entries cannot be present simultaneously in the slave store.

This situation will be detected by the circuits shown in FIG. 2, as described above, and the bistable 31 will be set, initiating the anti-thrashing mode. In this mode, the three required segment table entries will be retrieved in turn from the segment table in the main store and copied into locations 0, 1 and 2 of the ATM store 23. The instruction is then able to run to completion, using the contents of the ATM store 23 to translate the virtual addresses of the operands.

SOME POSSIBLE MODIFICATIONS

In the system described above, the slave store 22 and ATM store 23 were implemented as parts of the same random access memory 21. However, in other forms of the invention, it is possible that these two stores could be implemented as physically distinct memories.

The invention was illustrated above in the context of mapping segment table entries into a slave store. However, it should be appreciated that the invention is also applicable to mapping other types of data (e.g. operands) from a main store into a slave store.

We claim:

1. In a data processing system having a main store connected to a smaller, faster slave store into which data items are copied from the main store on demand, the data items in the main store being mapped on to the locations of the slave store according to a many-to-one mapping scheme, the improvement comprising:
   (a) a further store connected in tandem with the slave store, the further store being of smaller size than the slave store and having an access speed comparable to that of the slave store;
   (b) means connected to the slave store for producing a control signal when an attempt is made to access from the slave store two different data items which map on to the same location of the slave store, and
   (c) means connected to the slave store and further store, and responsive to said control signal, for suspending addressing of the slave store and addressing the further store instead when the control signal is present.

2. A system according to claim 1 further comprising address mapping means for converting an input virtual address into a hash address for addressing the slave store.

3. A system according to claim 2 wherein the slave store contains, in each location, the virtual address of the data item currently stored in that location.

4. A system according to claim 3 further comprising:
   (a) first comparison means for comparing the input virtual address with the virtual address contained in the currently addressed location of the slave store, and for producing a MISS signal if these two virtual addresses are not equal;
   (b) register means connected to the output of the address mapping means, for storing the value of the hash address whenever said MISS signal occurs;
   (c) second comparison means for comparing the contents of the register means with the output from the address mapping means and for producing a trigger signal if the comparison indicates equality; and
   (d) gating means, responsive to the MISS signal and the trigger signal, for producing said control signal whenever both the MISS signal and the trigger signal are present.

* * * * *